Aug. 15, 1967  W. S. MILLER  3,336,104
CONTINUOUS RECYCLE HEATING PROCESS FOR THE PRODUCTION
OF SODA ASH AND ALKALI METAL PHOSPHATES
Filed Dec. 13, 1963

INVENTOR
WARREN STANDISH MILLER

INVENTOR
WARREN STANDISH MILLER

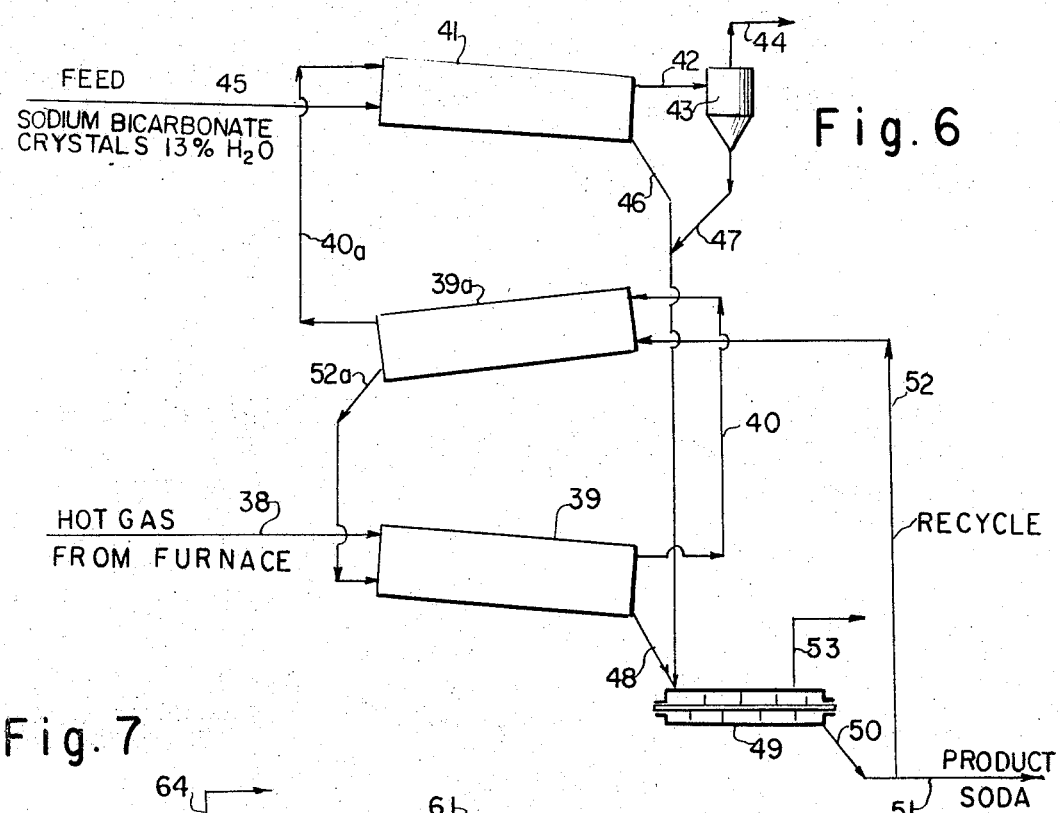
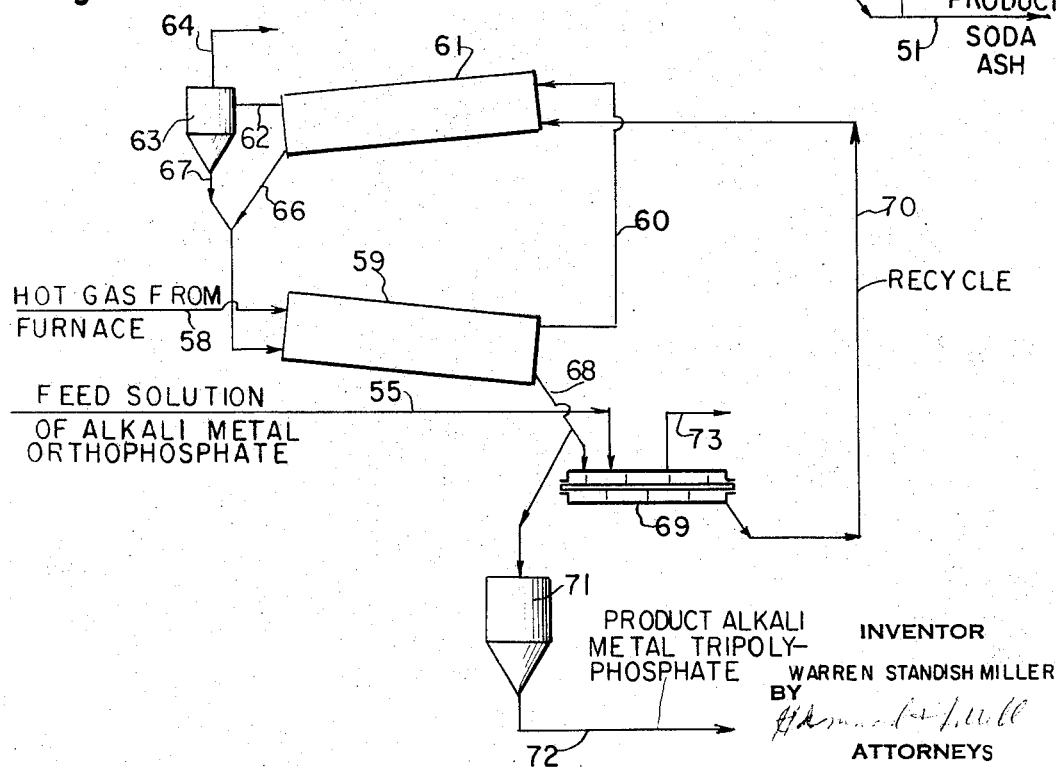

United States Patent Office 3,336,104
Patented Aug. 15, 1967

3,336,104
CONTINUOUS RECYCLE HEATING PROCESS FOR THE PRODUCTION OF SODA ASH AND ALKALI METAL PHOSPHATES
Warren Standish Miller, Fullerton, Calif., assignor, by mesne assignments, to Intermountain Research & Development Corporation, Cheyenne, Wyo., a corporation of Wyoming
Filed Dec. 13, 1963, Ser. No. 330,385
9 Claims. (Cl. 23—63)

The invention relates to a continuous process for transferring heat to a material which cannot use direct heat transfer apparatus by mixing the said material with recycle product which has been superheated by contact with a heating gas. The invention more particularly relates to a multiple stage process for transferring heat to a material from a heating gas by contacting recycle product with the hot heating gas to superheat the recycle product and using the superheated recycle product for transferring heat to the material to be heated.

Many processes cannot use direct heating methods due to the nature of the material being treated or of some special requirement of the particular process. For example, rapid calcination of soduim sesquicarbonate crystals causes "popcorning" and formation of agglomerates which give a less dense soda ash. Solvay Process sodium bicarbonate is usually calcined to soda ash by heat transfer through metal surfaces which is expensive in order to recover concentrated carbon dioxide gas as a side product. Oil shale has also been treated by expensive heat transfer through metal surfaces to obtain the vapors from the pyrolysis of the shale and coke has been obtained from coal heated through metal surfaces. Another problem is the rapid conversion of solutions of alkali metal orthophosphates to solid alkali metal polyphosphate to avoid undesirable growth of crystals.

Heat transfer equipment such as high velocity suspension type heaters and concurrent flow rotary heaters for heating by direct contact with hot gas are well known. For many applications, these heaters suffer from the defect that the heat transfer rate per unit of equipment volume is low and therefore the investment for equipment is high. The process of the invention gives a high heat transfer rate and results in a much smaller investment for equipment because the capacity of the equipment is greatly increased.

It is an object of the invention to provide a novel continuous process for heat transfer.

It is another object of the invention to provide a novel continuous process for increasing the capacity of heat transfer equipment.

It is an additional object of the invention to provide a novel continuous process of improved heat transfer in which evolved gases or vapors may be recovered in concentrated form.

It is another object of the invention to provide a novel continuous process for heat transfer without exposing the material being heated to oxidizing gases.

It is also an object of the invention to provide a novel continuous process for heat transfer wherein liquids are rapidly converted to solids without growth of large crystals.

It is another object of the invention to provide a novel continuous process for heat transfer wherein a product of desirable bulk density is obtained.

It is a further object of the invention to provide a heat transfer process by concurrent flow of hot gas and mixing of feed material with superheated recycle product.

These and other objects and advantages of the invention will become obvious from the following detailed description.

The continuous heat transfer process of the invention comprises contacting recycled solid product with a heating gas at a temperature above the desired final heating temperature for the feed material whereby the recycled product is superheated and the heating gas is tempered, mixing the feed material to be heated with the superheated recycle product whereby heat is transferred from the superheated recycle product to the feed material which is heated to the desired temperature, recovering part of the heated product and recycling the remainder of the product to contact with the superheated heating gas. In order to make the process more economical, the tempered heating gas after contact with the recycle product is preferably contacted with the feed material before, after or simultaneously with the mixing with the superheated recycle product in order to recover additional heat from the heating gas.

The process of the invention may be applied to any heat transfer process in which the recycle stream is a solid material derived from the feed. Examples of heat transfer processes in which the present process may be used are (1) the calcination of sodium sesquicarbonate to soda ash; (2) calcination of sodium bicarbonate to soda ash; (3) production of alkali metal phosphates from concentrated aqueous solutions of the orthophosphate salts; (4) and treatment of oil shale to recover oil and other useful products and many other solid final products.

The contacting of the recycled product with the heating gas and the contact of the feed material with the tempered heating gas may be effected in ordinary horizontal rotary or stationary vertical driers or calciners or in fluidized heating beds, all of which are well known to the art. The mixing of the superheated recycle product with the feed material or partially heated feed material can be effected in a mixer or if the feed material is to be treated with the tempered heating gas to recover additional heat, the superheated recycle product may be simply added to the feed material as it enters the driers, preferably rotary driers with lifting flights.

The heat transfer rates in direct contact heaters are directly proportional to the amounts of solids contacting the heating gas. One of the advantages of rotary equipment over the stationary suspension type is that the flights repeatedly lift the solids and repeatedly shower them through the gas. If the operating conditions are such that the flights are filled, a maximum transfer rate is obtained because the amount of solids being showered is at its maximum. The conditions required for operating with full flights are that the particle size shall be relatively large and the gas velocity relatively low. The gas tends to carry the particles along, the small particles being carried more than the large particles. When the gas velocity is high or the particles are small or both, this carry along moves the particles toward the discharge so rapidly that not enough material remains to fill the flights. Lack or material to fill the flights reduces the heat transfer rate proportionally.

The prior art processes in large equipment without recycle suffer from the defect of low heat transfer rate when treating materials of particle size smaller than about 4 mesh. By the processes of the present invention, the heat transfer rate of the prior art processes may be increased by recycling a sufficient amount of the superheated recycle product to maintain the flights substantially full. Increasing the amount of superheated recycle fills the flights and promotes better heat transfer between the superheated recycle and the material being heated.

The increase in heat transfer rate resulting from the use of superheated recycle solids permits the use of higher gas velocities which, in turn, increases the capacity of the equipment.

The use of two or more stages in concurrent flow increases the temperature span of the gas and therefore the heat economy and reduces the volume of gas required to supply the necessary quantity of heat. This reduction in gas volume further increases the capacity of the equipment.

The amount of superheated recycle product should be at least a 1:1 weight ratio with the feed material. The ratio of superheated recycle product to product ash may be 7:1 or higher, but a preferred ratio is 1:1 to 4:1 for economical reasons.

The particle size of the material being passed through the heating equipment also effects the heat transfer rate. The heat transfer rate is increased as the particle size decreases and the particles should be smaller than about 4 mesh, preferably 16 to 100 mesh.

In the accompanying drawings which show illustrative methods of applying the invention, FIG. 1 illustrates the calcination of sodium sesquicarbonate to soda ash using rotary superheaters.

FIG. 6 illustrates a process for the calcination of sodium bicarbonate or sodium sesquicarbonate to soda ash with the recovery of carbon dioxide in concentrated form.

FIG. 7 illustrates a process for the production of alkali metal tripolyphosphates from concentrated orthophosphate salt solutions.

Sodium sesquicarbonate crystals produced from underground trona deposits by the Pike process such as described in U.S. Patent No. 2,639,217 have adhering mother liquor corresponding to a moisture content of about 7% when they come from the centrifuges. The crystals are dried and calcined to produce sodium carbonate or soda ash. FIGS. 1 to 5 illustrate various methods for calcining sodium sesquicarbonate according to the process of this invention to obtain a soda ash with bulk density greater than 49 pounds per cubic foot at an increased production rate of 300 to 500% for calciners of a given size.

Sodium sesquicarbonate is a heat sensitive material which when heated too rapidly by direct contact with hot gas in a calciner tends to become less dense due to popcorning of the crystals when they first come into contact with the hot calcining gases. The popcorning effect causes a reduction in the density of the soda ash and increases the percentage of dust and undersize particles in the soda ash. The process of the invention prevents popcorning and produces an excellent commercial soda ash of desirable grain structure and greater density per cubic foot than produced by the normal calciner practice of the prior art.

Figure 1:
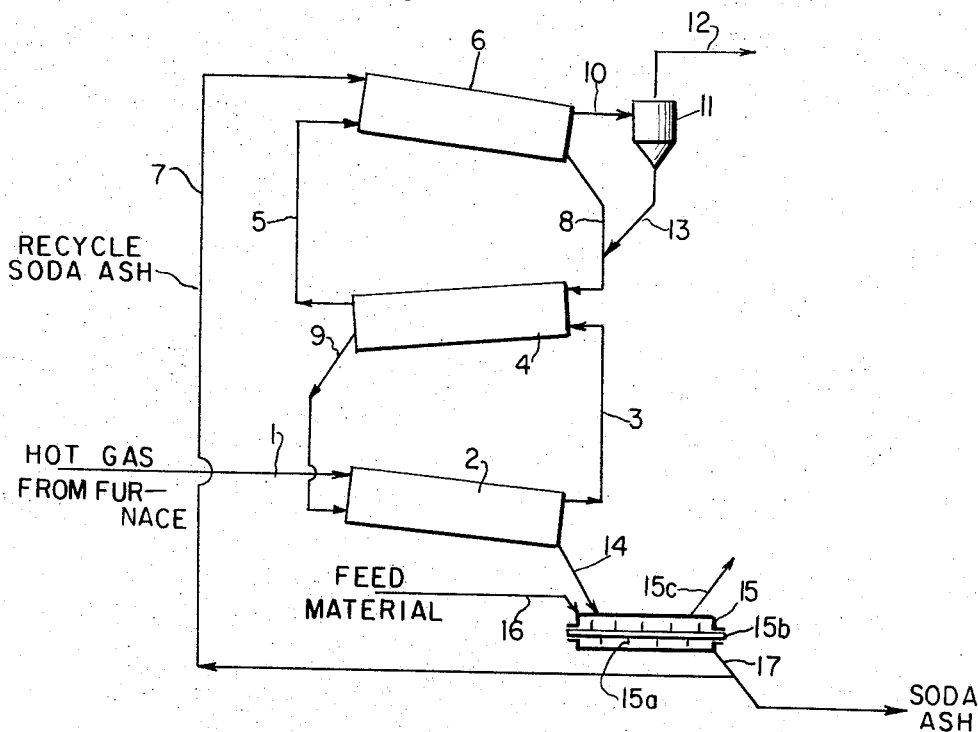

In my new process as illustrated in FIG. 1, rotating shells 2, 4 and 6 are the high stage, middle stage and low stage, respectively, of a 3 stage concurrent flow calciner. Hot gas at a temperature of about 1800° F. is passed by line 1 from any suitable source such as a furnace to one end of the high stage calciner 2 equipped with the usual lifting flights wherein the hot gas is contacted with heated recycle product passed by line 9 from middle stage calciner 4. The heating gas used in the normal or prior art process of calcining sodium sesquicarbonate is heated to an average temperature of about 1300° F. However, as the recycled product has already been calcined, it has no tendency to popcorn on contact with the hot gas, and can be superheated to higher temperatures without product degradation than sodium sesquicarbonate.

The gas from the high temperature stage calciner 2 is passed by line 3 to middle stage calciner 4 wherein it is contacted with recycle product passed by line 8 from the low temperature stage calciner 6. The heating gas is then passed by line 5 to low stage calciner 6 wherein it is contacted with recycle product passed from mixer 15 by line 7 to heat the recycle product. The cooled heating gas is passed by line 10 from low stage calciner to cyclone 11 wherein the fines are removed from the gas before being vented to the atmosphere by vent 12. The fines are added by line 13 to the recycle product as it is passed to middle stage calciner 4 by line 8.

The superheated recycle product is passed from high stage calciner 2 by line 14 to mixer 15 provided with rotating conveyor blades 15a on a rotating shaft 15b, driven by suitable means (not shown), wherein it is mixed with sodium sesquicarbonate crystals from line 16 and the sodium sesquicarbonate crystals are calcined to soda ash by the heat transferred from the superheated recycle product without popcorning or agglomeration. The soda ash is removed from the mixer by line 17 and part of the soda ash is recycled to low stage calciner 6 by line 7 and the remainder is recovered. The carbon dioxide and water vapor are vented to the atmosphere by vent 15c.

Figure 2:
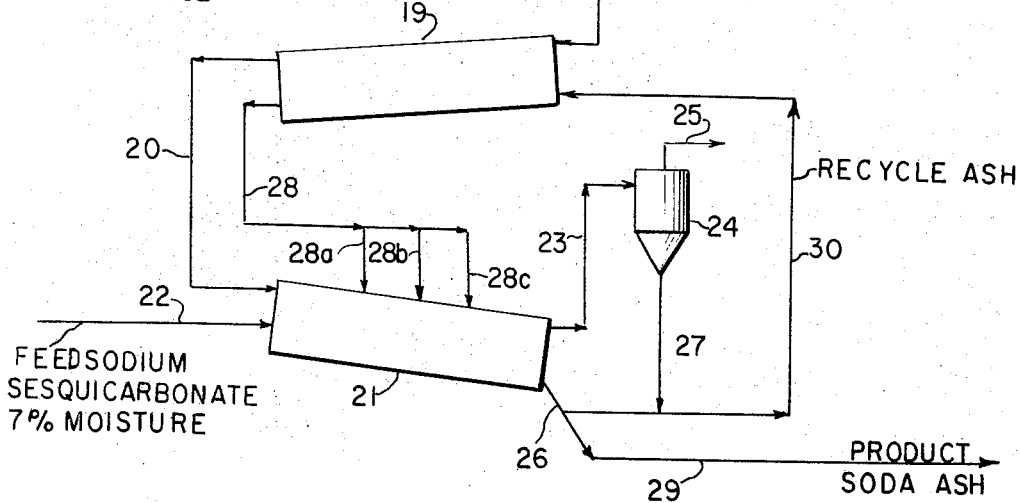
FIGS. 2, 3 and 5 illustrate three different processes for the calcination of sodium sesquicarbonate to soda ash using rotary calciners and treatment of the feed material with the tempered heating gas.

FIG. 2 illustrates another form of the process wherein rotating shells 19 and 21 are the high temperature and low temperature stage, respectively, of a 2-stage concurrent flow calciner. Hot gas at a temperature of about 1800° F. is passed by line 18 from any suitable source such as a furnace to one end of the high stage calciner 19 equipped with the usual lifting flights wherein the hot gas is contacted with recycle soda ash from line 30. During the contact in stage 19 the hot gas is cooled to a temperature of about 900° F. and the recycle soda ash is heated to about 800° F. As the recycle soda ash has already been calcined before contacting the hot gas, it has no tendency to popcorn on contact with the superheated gas.

The gas leaves high stage calciner 19 by duct 20 which delivers the gas to one end of low stage calciner 21. Sodium sesquicarbonate crystals having a moisture content of about 7% due to adhering mother liquor is fed by line 22 into the low stage calciner 21 which contains lifting flights to shower the particles through the gas. The stream of highly heated or superheated soda ash from the high stage calciner 19 is delivered by line 28 to the low stage calciner 21 at one or more, preferably three, intermediate points (28a, 28b, 28c). The superheated soda ash and the fresh sodium sesquicarbonate feed are mixed by the showering of crystals by the flights in low stage calciner 21. The gas passes from the end of the low stage calciner 21 in a line 23 to a cyclone 24 or other device for separating dust from the gas and the gas passes from the cyclone via line 25 to a heat recovery system. The soda ash is conducted from the low stage calciner 21 by line 26 and part of the soda ash is conveyed by line 29 to the product storage and packing stage and the remainder of the soda ash is recycled through the line 30 to the high stage calciner 19. The fines recovered in the cyclone 24 are returned through line 27 to the recycle ash stream. As stated previously, the recycle ash stream may be in the ratio of about 1:1 to 7:1 to the product ash, but is preferably of the ratio of 1:1 to 4:1.

Figure 3:
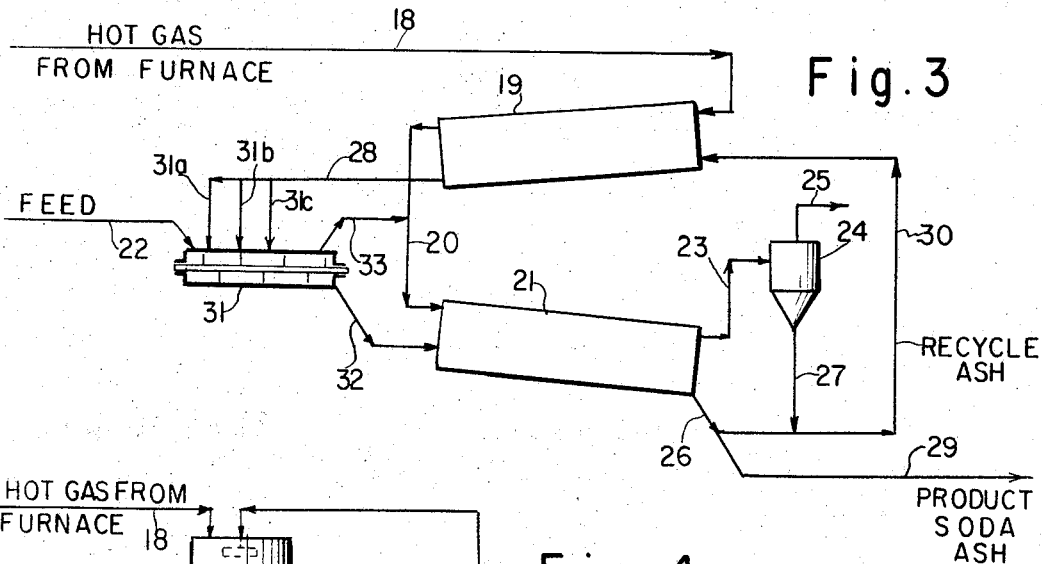

FIG. 3 illustrates an alternative flow of the solids according to the process of this invention with the flow of the heating gas remaining the same as in FIG. 2. The feed stream 22 of moist sodium sesquicarbonate crystals goes directly to a mixer 31 equipped with a rotating shaft and conveyor blades into which the superheated soda ash from line 28 is added at one or more points (31a, 31b, 31c) along the length of the mixer 31. The superheated soda ash and the moist sodium sesquicarbonate are thoroughly mixed in mixer 31 and the sodium sesquicarbonate is dried and partially decomposed to soda ash by the heat transfer. The product from mixer 31 is passed by line 32 to the low stage calciner 21 for contact with the tempered gas to decompose the remainder of the sodium sesquicarbonate. The soda ash product is removed through line 26 and then divided into a product stream 29 and a recycle stream 30 which is returned to the high stage calciner 19 as described in connection with FIG. 2.

Figure 4:
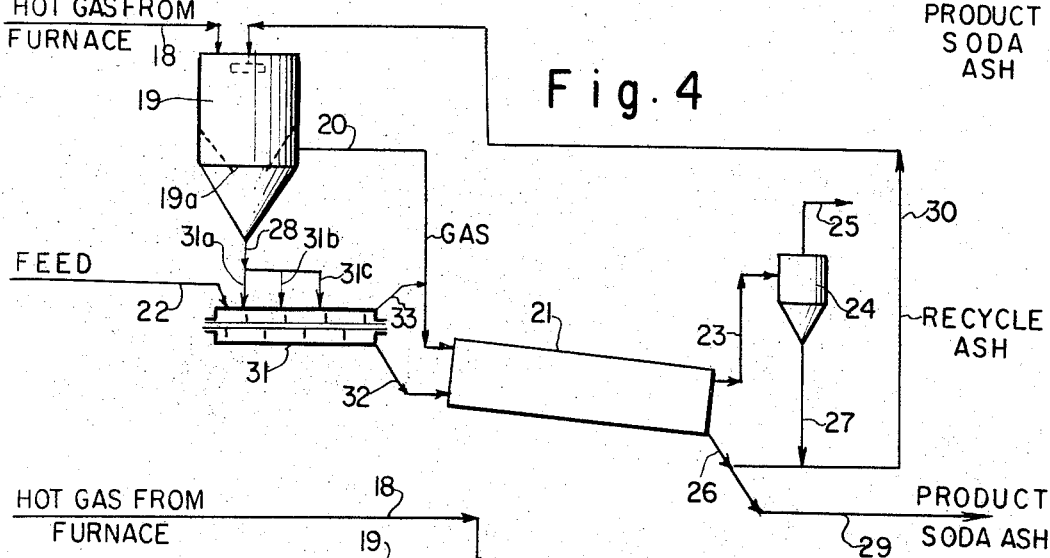
FIG. 4 illustrates the calcination of sodium sesquicarbonate to soda ash using a stationary vertical calciner or superheater.

FIG. 4 illustrates a flow arrangement similar to FIG. 3 except that the rotating high stage calciner 19 of FIG. 3 is replaced with a stationary vertical chamber 19a which functions in the same manner in superheating the recycle soda ash. The finely divided recycle soda ash falls through the chamber 19a in concurrent flow with the hot gas and absorbs heat therefrom. The flow of hot gas and solids is otherwise identical to their flow in FIG. 3. In each of these embodiments, the off gas and fines from mixer 31 pass through the line 33 to the heating gas stream flowing from the high stage calciners to the low stage calciners.

Figure 5:
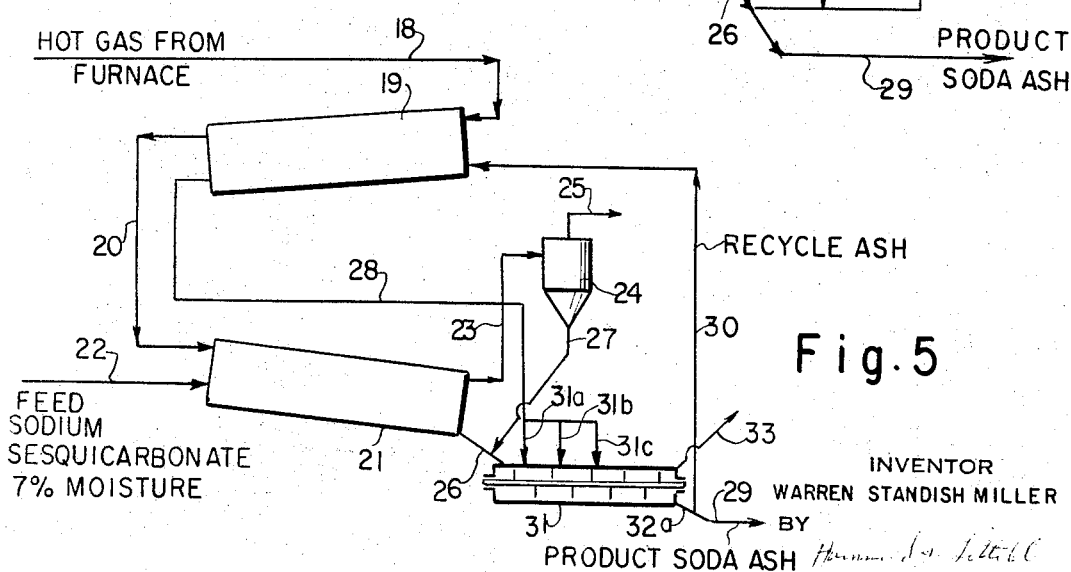

FIG. 5 illustrates another alternative flow arrangement for contacting the solids with the hot gas flow, the gas flow remaining the same as in FIG. 2. In this illustrative embodiment, feed stream 22 of moist sodium sesquicarbonate is passed to the low stage calciner 21 for contact with the hot gas in stream 20 which has been tempered and reduced in temperature in the high stage calciner 19 and the sodium sesquicarbonate is dried and partially decomposed to soda ash in the low stage calciner 21. The mixture from the low stage calciner 21 is passed by line 26 to mixer 31 wherein it is thoroughly admixed with superheated soda ash from line 28 which is added to the mixer at one or more points (31a, 31b, 31c). The remainder of the sodium sesquicarbonate is decomposed to soda ash in mixer 31 and the soda ash is removed by line 32a. The soda ash is divided into a product stream 29 and a recycle stream 30 as in FIG. 2. The gas and fines from the low stage calciner 21 flow through line 23 to a cyclone 24 where the fines are separated and returned to the solid stream 26 and the gases pass through the line 25 to a heat recovery system. The vapors from the reaction in mixer 31 are discarded through vent 33.

Moist sodium carbonate monohydrate and moist anhydrous sodium carbonate may be calcined or dried to produce soda ash in a similar manner to that described above in connection with FIGS. 1 to 5.

FIG. 6 is a typical flow sheet illustrating the application of the process of the invention to calcining sodium bicarbonate produced in the Solvay Process of producing soda ash with recovery of carbon dioxide. The usual process for this calcination requires heat transfer through metal surfaces to the wet sodium bicarbonate cake and is expensive because much massive equipment is needed due to the low heat transfer rate.

In this illustrative embodiment of the process, hot gas at a temperature of about 1800° F. from line 38 is introduced into the second stage 39 of a concurrent flow heater system wherein it is contacted with heated soda ash from the first stage heater 39a in which the soda ash has been heated. The gas from heater 39 is passed by line 40 to the first stage 39a of the heater system where it is contacted with recycle soda ash to heat the said recycle soda ash before it is passed to the second stage 39 by conveyor line 52a. The gas from heater 39a is then passed by line 40a to dryer 41 wherein it is contacted with moist sodium bicarbonate crystals or filter cake from line 45 to partially remove the moisture from the sodium bicarbonate, without substantial decomposition of the sodium bicarbonate. The gas is passed from the dryer 41 through line 42 to cyclone 43 to remove fines from the gas before the gas is vented to the atmosphere through line 44. The dust fines are removed by line 47 and added to the dried sodium bicarbonate coming from the dryer 41 through the conveyor line 46. The partially dried sodium bicarbonate from line 46 is mixed in mixer 49 equipped with a rotating blade conveyor with superheated recycle soda ash at a temperature of about 850° F. from conveyor 48 with exclusion of any alien or non-$CO_2$—$H_2O$ atmosphere for about 2 to 5 minutes wherein the superheated soda ash transfers heat to the sodium bicarbonate causing it to decompose according to the reaction

The carbon dioxide and water vapor are removed through line 53 to a condenser (not shown) for recovery of the carbon dioxide for reuse in the Solvay Process. The soda ash is removed from mixer 49 at a temperature of about 320° F. by conveyor 50 and is divided into a soda ash product stream 51 and a recycle soda ash stream 52 which goes to the heater 39a. The ratio of recycle soda ash to product ash is preferably of the order of 4:1 to 7:1.

FIG. 7 illustrates a flow sheet for the application of the process of the present invention to the production of alkali metal phosphates, such as sodium tripolyphosphate, trisodium phosphate, pyrophosphates and the like, from concentrated aqueous solutions of orthophosphate salts. For example, a high yield of alkali metal tripolyphosphate depends upon rapid conversion of the aqueous solution to a dry solid in order to prevent the growth or segregation of crystals of mono- and di-alkali metal orthophosphates.

In this embodiment of the invention, hot gas from a furnace is introduced through line 58 into the second stage 59 of a two stage concurrent flow heater (59, 61), where it is contacted with dry tripolyphosphate to superheat the solid tripolyphosphate (950° F. for the sodium salt). The gas is then passed by line 60 to the first or dryer stage 61 wherein the gas is contacted with moist recycle tripolyphosphate to dehydrate it. The gas is then passed by line 62 to cyclone 63 to remove dust fines from the gas before it is vented to the atmosphere by line 64. The dust fines are passed by line 67 to conveyor 66 carrying the dried tripolyphosphate from the dryer stage 61 to the second stage 59.

The aqueous feed solution of alkali metal orthophosphate is pumped through line 55 to mixer 69, equipped with a rotating blade conveyor, wherein it is contacted with superheated tripolyphosphate brought from the second stage 59 by conveyor 68 in a ratio so that the temperature in the mixer 69 is kept high enough to prevent a liquid phase of water from forming, about 265° F., for example. The water vapor is removed by line 73 and the products from mixer 69 which are ortho- and pyro-phosphates and hydrated tripolyphosphate

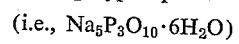

as well as tripolyphosphate is recycled by conveyor 70 to the drier stage 61. Part of the superheated tripolyphosphate from conveyor 68 is diverted to hot retention tank 71 from which it emerges as product stream 72. In a similar manner, other alkali metal phosphates may be produced from phosphate solutions.

Figure 8:
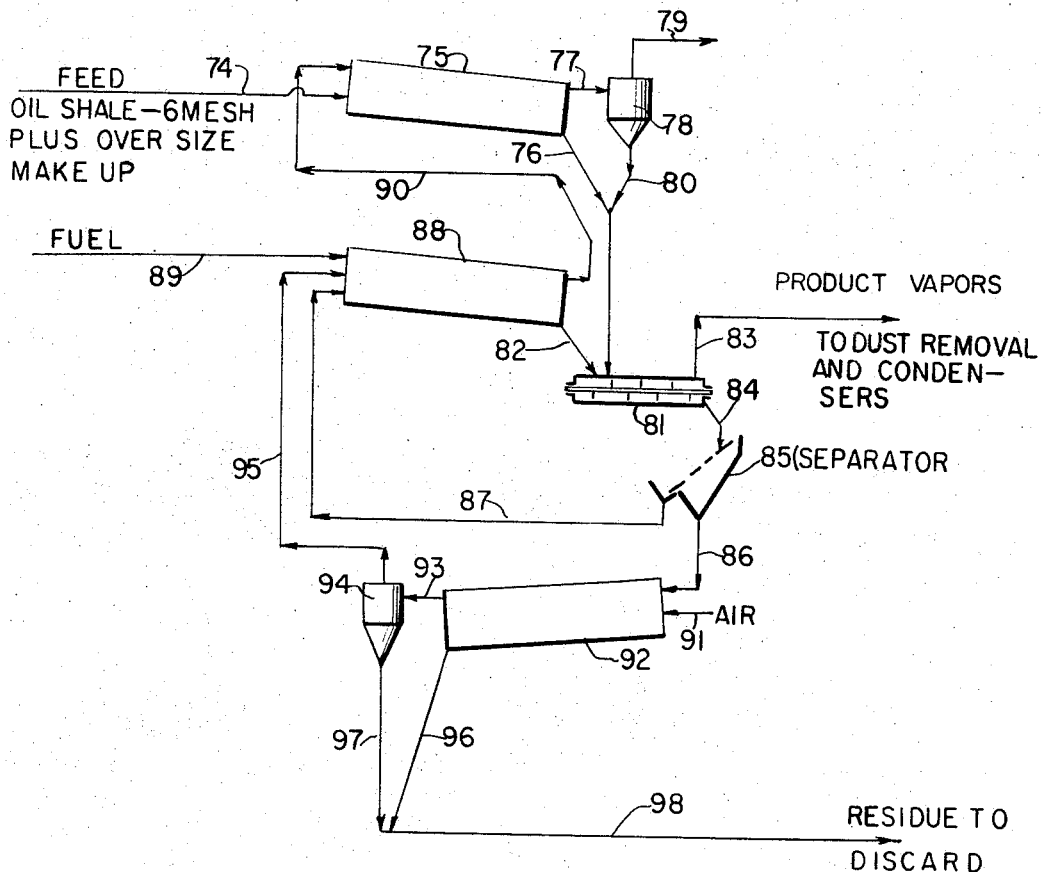
FIG. 8 illustrates a process for the recovery of oil from oil shale.

FIG. 8 is a flow sheet of a process for the treatment of oil shale to recover oil and other products therefrom in a more economical manner than prior methods. The prior methods have been very expensive due to the large equipment investment compared to the value of the oil recovered. The present process employs a recycle stream of coarse oil shale superheated by hot gases to transfer heat to the oil shale to pyrolyze the organic material contained therein and distill out the oil.

Oil shale of −6 mesh or less size is passed by conveyor 74 to rotary preheater 75 where it is contacted with hot gas stream 90 to heat the oil shale to about 300° F. The gas is passed by line 77 to cyclone 78 to remove dust fines from the gas before it is discarded by line 79. The dust fines are added to the heated oil shale stream 76 by line 80 and then introduced into mixer 81, equipped with a rotating blade conveyor. The feed oil shale is mixed thoroughly with a coarse superheated oil shale and liberation of organic oil vapors and other products which are removed by line 83 for recovery.

The solids from the mixer 81 are delivered by conveyor 84 to separator 85 which divides the solids into an oversize stream 87 of material greater than ¼ inch and an undersize stream 86 of material less than ¼ inch. The oversize stream 87 is passed to heater 88 in which combustion takes place. The fuel stream which may be natural gas, byproduct gas, fuel oil, byproduct oil, coal, shale oil, etc., enters the heater by line 89. The coarse or oversize material is superheated to about 1400° F.

The undersize stream 86 is delivered to a rotating cooler 92 wherein it is contacted with air from line 91. The air leaves the cooler 92 by line 93 and is passed to cyclone 94 wherein the fines and dust are removed. The air is passed from the cyclone 94 by line 95 to heater 88 where it supplies the oxygen for the combustion in the heater. The undersize material is removed from the cooler 92 by conveyor 96 and is joined with the fines on conveyor 97 from the cyclone 94 and is discarded by conveyor 98.

The cooler 92 is not essential but it contributes to the economy of the operation by preheating the air for combustion. Other types of heaters may be used to heat the recycle stream. Fans are necessary for moving the gases, but are not shown since their position is optional. The particle size may vary in size and the retention times will vary accordingly.

Various other modifications and changes can be made in the process described without departing from the spirit of the invention or the scope of the following claims.

I claim:

1. A continuous heat transfer process which comprises contacting recycle soda ash with a heating gas heated above the temperature necessary to heat the feed material to the desired product temperature in a concurrent flow whereby the recycle soda ash is superheadted and the heating gas is tempered, contacting the feed material selected from the group consisting of sodium sesquicarbonate, sodium carbonate monohydrate and moist anhydrous sodat ash to be heated with the tempered heating gas in a concurrent flow and mixing the superheated recycle soda ash with the feed material, whereby the feed material is heated by transfer of heat from the heating gas and the superheated recycle soda ash to the desired soda ash temperature, recovering part of the heated material and recycling the remainder of the material to contact with the heating gas.

2. The process of claim 1 in which the recycle ratio of superheated recycle soda ash to product soda ash is from 1:1 to 7:1 by weight.

3. A continuous process for the calcination of sodium sesquicarbonate to form soda ash having a high bulk density which comprises contacting recycle soda ash with a hot heating gas heated above the temperature required to calcine the sodium sesquicarbonate to soda ash in a concurrent flow whereby the soda ash is superheated and the temperature of the heating gas is tempered, contacting the sodium sesquicarbonate with the tempered heating gas in a concurrent flow and mixing the superheated recycle soda ash with the sodium sesquicarbonate whereby the sodium sesquicarbonate is heated by transfer of heat from the heating gas and the superheated recycle soda ash to the calcination temperature required to form soda ash, recovering part of the soda ash and recycling the remainder of the soda ash to contact with the hot heating gas.

4. The process of claim 3 in which the recycle ratio of superheated recycle soda ash to product soda ash is from 1:1 to 7:1 by weight.

5. A continuous process for the calcination of sodium carbonate monohydrate to form soda ash which comprises contacting recycle soda ash with a hot gas, heated above the temperature required to calcine the sodium carbonate monohydrate to soda ash, in a concurrent flow whereby the recycle soda ash is superheated and the temperature of the heating gas is tempered, contacting the sodium carbonate monohydrate with the tempered heating gas in a concurrent flow and mixing the superheated soda ash with the sodium carbonate monohydrate, whereby the sodium carbonate monohydrate is heated by transfer of heat from the heating gas and the superheated recycle soda ash to calcine the sodium carbonate monohydrate to soda ash, recovering part of the soda ash and recycling the remainder of the soda ash to contact with the hot heating gas.

6. The process of claim 5 in which the recycle ratio of superheated soda ash to product soda ash feed is from 1:1 to 7:1 by weight.

7. A continuous process for the drying of moist anhydrous sodium carbonate to form soda ash which comprises contacting recycle soda ash with a hot gas, heated above the temperature required to dry the moist anhydrous sodium carbonate with the tempered heating gas in a concurrent flow and mixing the superheated soda ash with the moist anhydrous sodium carbonate whereby the moist anhydrous sodium carbonate is heated by transfer of heat from the heating gas and the superheated recycle soda ash to dry the moist anhydrous sodium carbonate to soda ash, recovering part of the soda ash and recycling the remainder of the soda ash to contact with the hot heating gas.

8. The process of claim 7 in which the recycle ratio of superheated soda ash to product soda ash is from 1:1 to 7:1 by weight.

9. The method of producing alkali metal phosphate salts from alkali metal phosphate solutions, which comprises contacting recycle alkali metal phosphate salt with a hot gas, heated above the temperature required to convert alkali metal phosphate solutions into solid salts whereby the recycle alkali metal phosphate salt is superheated, contacting the alkali metal phosphate solution with the superheated recycle salt to convert the alkali metal phosphate solution into crystalline salt, contacting the crystalline salt with tempered heating gas to dehydrate the said salt, recovering a portion of the crystallized salt and recycling the remainder of the crystalline alkali metal salt to contact with the hot heating gas.

References Cited

UNITED STATES PATENTS

| | | | |
|---|---|---|---|
| 1,602,819 | 10/1926 | Jakowsky | 201—36 |
| 2,034,599 | 3/1936 | Van Marle | 23—107 |
| 2,459,414 | 1/1949 | Carrier | 23—63 |
| 2,582,712 | 1/1952 | Howard | 201—28 |
| 3,028,215 | 4/1962 | Frint | 23—107 |
| 3,030,180 | 4/1962 | Bigot | 23—106 |
| 3,049,419 | 8/1962 | Raistrick et al. | 23—106 X |
| 3,057,680 | 10/1962 | Schytil | 23—106 |
| 3,167,494 | 1/1965 | Crawford | 208—11 |
| 3,189,408 | 6/1965 | Miller | 23—63 |

FOREIGN PATENTS

| | | |
|---|---|---|
| 883,202 | 11/1961 | Great Britain. |

OSCAR R. VERTIZ, Primary Examiner.

DANIEL E. WYMAN, Examiner.

P. E. KONOPKA, G. T. OZAKI, Assistant Examiners.